No. 785,329. Patented March 21, 1905.

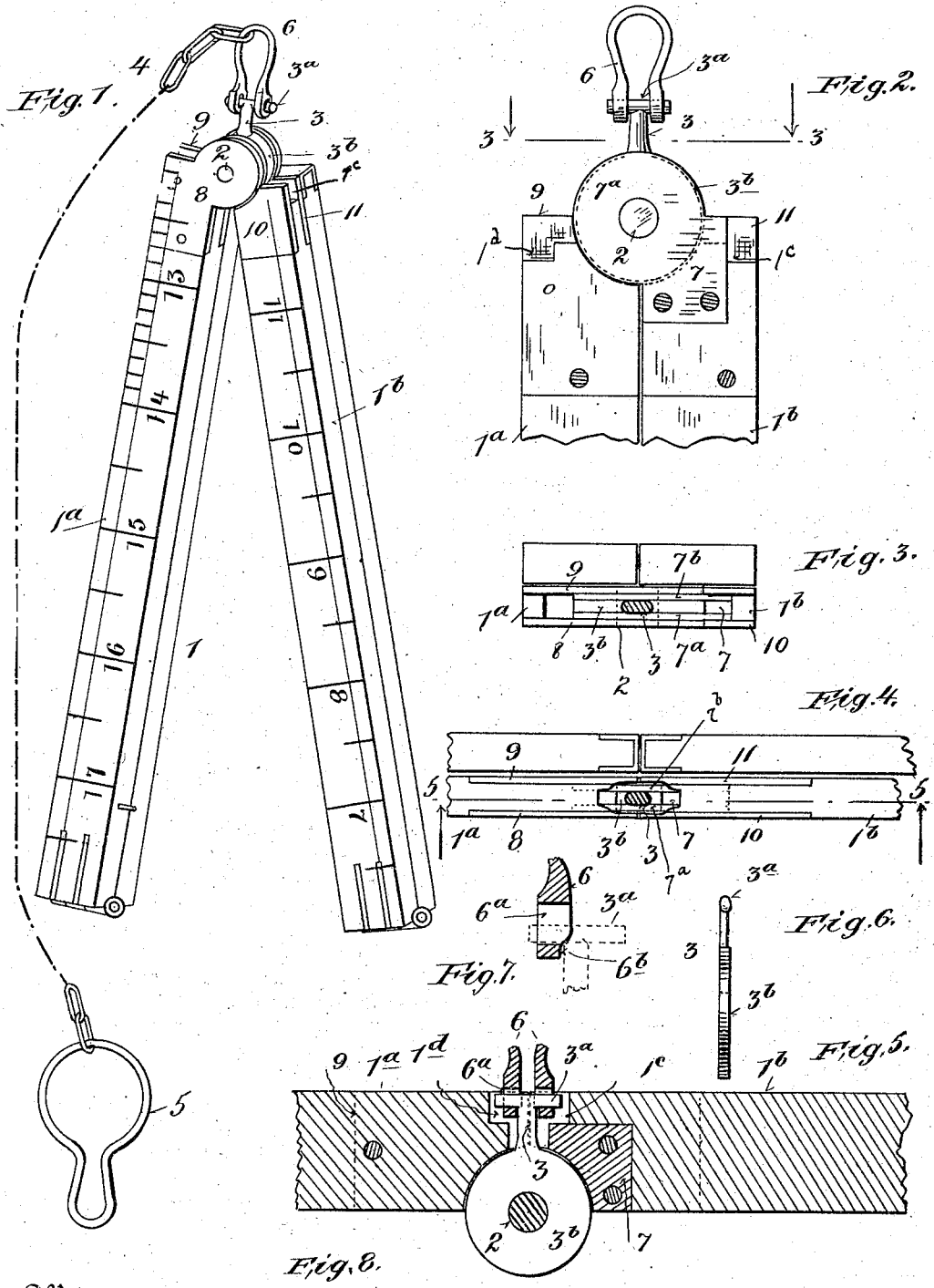

UNITED STATES PATENT OFFICE.

CHARLES O. RASMUSSEN, OF NEW YORK, N. Y.

RULE.

SPECIFICATION forming part of Letters Patent No. 785,329, dated March 21, 1905.

Application filed November 21, 1904. Serial No. 233,753.

*To all whom it may concern:*

Be it known that I, CHARLES O. RASMUSSEN, a citizen of the United States, and a resident of New York city, borough of Brooklyn, New York, have invented certain new and useful Improvements in Rules, of which the following is a specification.

My invention relates to improvements in rules, and more particularly to the class of rules commonly called "two-foot rules;" and the invention has for its object to provide means to connect the rule with a chain or the like that may be attached to a garment for the purpose of preventing loss of the rule and keeping it ready at hand for use.

In carrying out my invention I provide a supporting-stem that is pivotally connected with the pivot of the main joint or hinge, to which stem a chain or the like is connected, the adjacent members of the rule being cut away at their meeting edges at the joint to permit the members to open in usual manner without interference by said stem.

The invention also comprises the novel details of improvement that will be more fully hereinafter set forth and then pointed out in the claims.

Reference is to be had to the accompanying drawings, forming part hereof, wherein—

Figure 1 is a perspective view of a two-foot rule embodying my improvements. Fig. 2 is an enlarged detail view of the rule at the main joint, the outer side plates being removed. Fig. 3 is an end view thereof, the stem being in section, on the line 3 3 in Fig. 2. Fig. 4 is an edge view of the members of the rule opened, the stem being in section. Fig. 5 is an enlarged sectional view on the line 5 5 in Fig. 4. Fig. 6 is a detail edge view of the stem for connection with a chain. Fig. 7 is a detail section, enlarged, of one end of the loop that connects with the stem; and Fig. 8 is a detail edge view of one member of the hinge.

Similar numerals of reference indicate corresponding parts in the several views.

In the drawings the numeral 1 indicates generally a two-foot rule of well-known construction, in which the members $1^a$ $1^b$ are connected by the well-known rule-joint, (modified as hereinafter explained,) having the pivot 2.

At 3 is a stem mounted upon the pivot 2 so as to lie within the outline of the rule when the same is opened, which stem is to be attached to a chain or other flexible connection 4, shown provided with a loop 5 for attachment to a button on a garment; but said chain may carry any other well-known device for connection with a garment. The stem 3 is shown provided at one end with T-shaped head $3^a$ and a disk portion $3^b$ at the other end, the arms of said head being shown extending in the plane of the disk.

At 6 is indicated a spring-like yoke provided at its ends with opposed eyes $6^a$ to receive the arms $3^a$ of the stem, which yoke is shown in Fig. 1 receiving a link of chain 4, whereby the chain may be readily attached to and detached from the stem 3. The inner faces of the arms of yoke 6 at their lower ends are preferably hollowed at $6^b$ to fit against the sides of stem 3 to reduce the width of the parts at the connection of the yoke with the stem. To provide space for the disk portion $3^b$ of the stem 3, the usual hinge member 7, that is received between the side plates 8 9 of the hinge, is recessed or forked, forming jaws $7^a$ $7^b$, (see Fig. 8,) that receive between them the disk portion $3^b$ of stem 3, (see Fig. 3,) said jaws being received between the side plates 8 9 of the member $1^a$, the pivot 2 passing through said side plates, the jaws $7^a$ $7^b$, and the disk member $3^b$, the latter thus being contained within the members of the joint or hinge. The stem 3 and its head portion are preferably made of such length as not to project beyond the surface of the outer edges of the members $1^a$ $1^b$, and the adjacent end portions of said members are cut away at $1^c$ $1^d$ to provide a socket or recess within which the stem and its head $3^a$ are received, so as to be concealed when the rule is extended. (See Fig. 5.) The socket thus formed at $1^c$ $1^d$ is also of sufficient dimensions to receive the ends of the loop 6, Fig. 5.

At 10 11 are the usual outer plates riveted to the member $1^b$ over the hinge-block 7.

When the rule is closed, as in Figs. 2 and 3, the stem 3 will project beyond the surface of the hinge or joint members, and the rule can thus hang from the chain 4; but when the rule is opened the stem 3 and its head portion will be concealed in the recess between the abutting ends of the members 1ª 1ᵇ, and the rule will thus be free for use in the ordinary manner, and if a line is to be ruled along the edges of the members 1ª 1ᵇ past the stem 3 the pencil may stop at one side of yoke 6 and the line be continued from the other side of the yoke, and then the rule can be adjusted to complete drawing the line. It will thus be seen that as my improvements are located within the main joint or hinge the stem will be substantially a component part of the rule, but without interfering with the customary use of the rule, at the same time protecting the rule from loss when the chain is attached to the user's garment.

Having now described my invention, what I claim is—

1. A rule provided with a stem pivotally connected with the pivot of the main joint or hinge, and means for attaching said stem to a flexible connection, the stem being of such length as not to project beyond the edges of the members of the rule when said members are extended in a straight line for use, substantially as described.

2. A rule provided with a recess in its edge portion adjacent to the pivot of its main joint or hinge, and a stem pivotally connected with said pivot and having a portion entering said recess when the rule is extended, the stem being of such length as not to project beyond the edges of the members of the rule when said members are extended in a straight line for use, substantially as described.

3. A rule provided with a main joint or hinge having a pivot, and a stem provided with a disk-like portion mounted upon said pivot, said stem extending between the abutting ends of the members of the rule, the stem being of such length as not to project beyond the edges of the members of the rule when said members are extended in a straight line for use, substantially as described.

4. A rule provided with a main joint or hinge having a pivot, and a stem provided with a disk-like portion mounted upon said pivot, the stem extending outwardly between the abutting ends of the members of the rule, said members being provided with recesses at the corners of their outer edges to receive said stem when said members are extended, substantially as described.

5. A rule having a main joint or hinge, the members of the rule having recesses at the outer abutting corners, and a stem having a disk portion mounted upon the pivot of the hinge and a head portion having its members lying substantially in the plane of the disk, said head portion of the stem being located in position to lie within said recesses when the members of the rule are extended, substantially as described.

6. A rule having a main joint or hinge, the members of the rule having recesses at the outer abutting corners, a stem having a disk portion mounted upon the pivot of the hinge and a head portion having its members lying substantially in the plane of the disk, said head portion of the stem being located in position to lie within said recesses when the members of the rule are extended, and a yoke detachably connected with said head for attachment to a flexible connection, subtantially as described.

7. A rule having two members pivotally connected together, one of said members having two outer plates, the other member having an inner block provided with jaws, a stem having a disk-like portion received between said jaws, and a pivot passing through said plates, jaws and disk, the adjacent end portions of said members being recessed to receive the stem, substantially as described.

CHAS. O. RASMUSSEN.

Witnesses:
T. F. BOURNE,
M. HOLLINGSHEAD.